Figure 1:
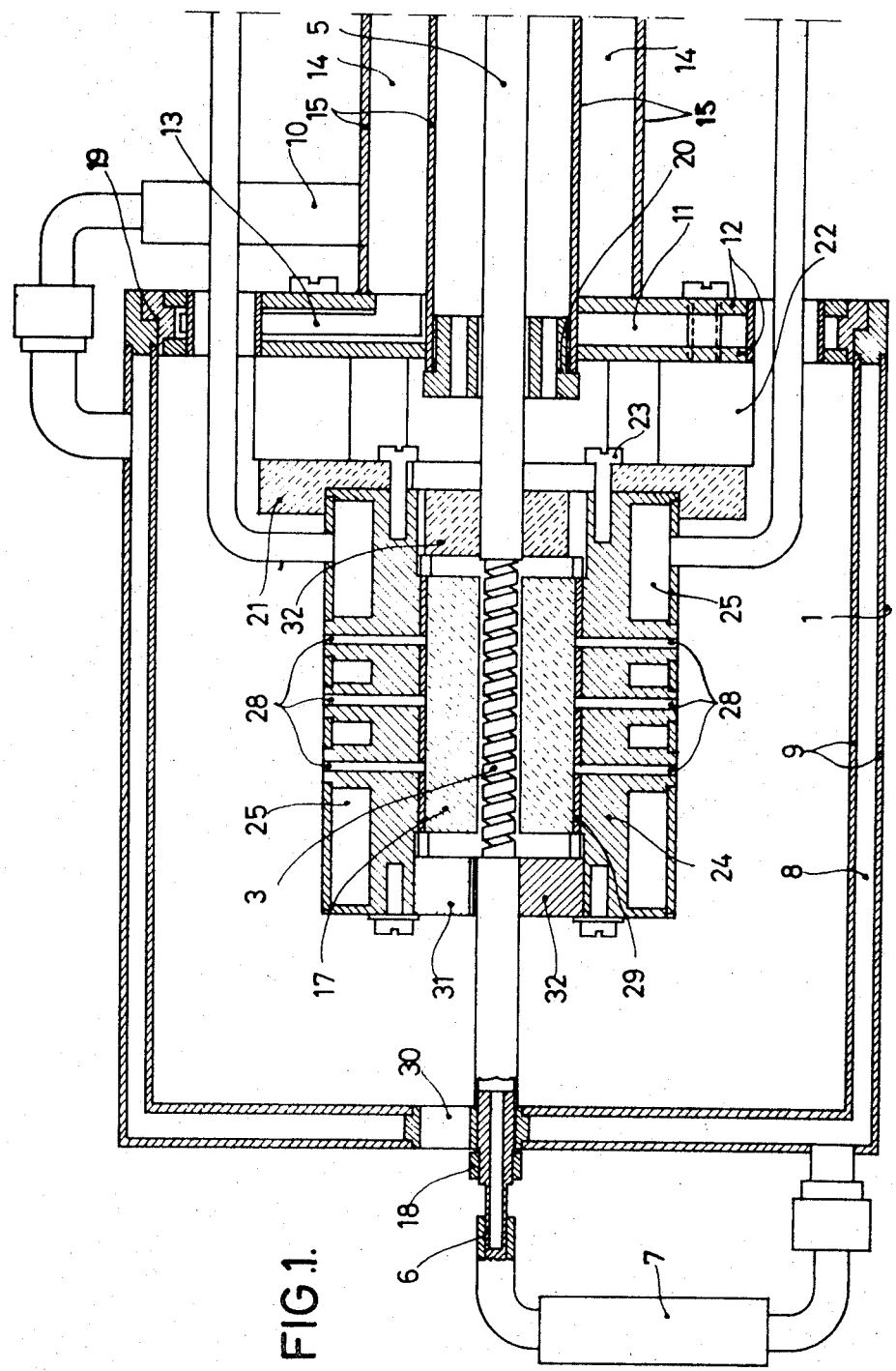

United States Patent
Orecchia

[15] 3,666,869
[45] May 30, 1972

[54] METHOD AND APPARATUS FOR SETTING UP A TEMPERATURE GRADIENT

[72] Inventor: Luigi Orecchia, Gavirate, Italy

[73] Assignee: European Atomic Energy Community (Euratom), European Center Kirchberg, Luxembourg

[22] Filed: Feb. 2, 1970

[21] Appl. No.: 7,847

[30] Foreign Application Priority Data

Feb. 1, 1969 Italy..................................34662 A/69

[52] U.S. Cl....................................13/20, 219/6.5, 219/10.57
[51] Int. Cl. .........................................................H05b 5/00
[58] Field of Search..............................13/20, 25, 26, 28, 31; 219/6.5, 10.49, 10.57, 10.79; 73/15

[56] References Cited

UNITED STATES PATENTS

| 2,342,532 | 2/1944 | Doelher | 219/10.79 |
| 2,397,442 | 3/1946 | Somes | 219/10.79 |
| 2,768,277 | 10/1956 | Buck et al. | 13/31 X |

Primary Examiner—Bernard A. Gilheany
Assistant Examiner—R. N. Envall, Jr.
Attorney—Stevens, Davis, Miller & Mosher

[57] ABSTRACT

A method and apparatus for setting up a temperature gradient across a hollow member which is a good conductor of heat such as uranium carbide testpiece of simulate the thermal conditions of fuel inside a nuclear reactor. A uranium carbide hollow member has a high frequency AC heating means inside it and a cooling jacket surrounding it to provide a temperature gradient of approximately 450° C.

9 Claims, 2 Drawing Figures

Patented May 30, 1972

3,666,869

2 Sheets-Sheet 2

METHOD AND APPARATUS FOR SETTING UP A TEMPERATURE GRADIENT

The invention relates to a method and apparatus for setting up a temperature gradient across hollow members to simulate the thermal conditions of fuel inside a nuclear reactor.

An object of the invention in one of its forms is to internally heat a uranium carbide testpiece to a temperature of approximately 1,300° C. and to cool the outer surface of the testpiece to approximately 450° C. in order to study the structural change in uranium carbide subjected to a thermal gradient of approximately 850° C.

A known system is used for similar purposes on uranium oxide. In the known system, a resistor made of graphite or another refractory material and situated within the uranium oxide testpiece is heated by an electric current suitably adjusted with rheostats or magnetic transducers, whereupon the resistor transmits its heat to the testpiece by conduction and radiation. In the case of heat transmission by radiation, the known system does not give the desired results if applied to uranium carbide, because uranium carbide is a good conductor of heat compared with uranium oxide, so that very high specific outputs from the resistor are required, which cannot be transmitted by simple radiation.

In the case of heat transmission by conduction, the main requirement is to obtain optimum contact between the resistance and the uranium carbide. Since, however, uranium carbide is a good conductor of electricity, the resistance used within the testpiece has to be insulated by applying a thin layer of repeatedly ground alumina thereto. The different materials, however, are found to be incompatible, in view of the temperature, the diffusion of graphite through, and short-circuiting of, the alumina after a few hours of operation, the resistance and the temperature and pressure conditions in operation. Furthermore, the forces produced by the thermal expansion of the resistance can break the uranium carbide testpieces. It is also difficult to align the testpieces exactly with the current input terminals, which are large since the current may vary from 500 to 2,000 amperes depending on the resistances used, and it is also difficult to maintain the alignment after movements have been caused by thermal expansion.

The high frequency heating method is also beset by considerable difficulties, since the induction coil, which has small dimensions, has a considerably smaller impedance than the impedance of normal circuit connections.

The invention provides a method of setting up a radial temperature gradient across a hollow member which is a good conductor of heat (e.g. a uranium carbide testpiece), comprising surrounding the member with a cooling jacket to cool the external surface thereof, inserting a high impedance portion of a low-impedance co-axial electrical circuit into the hollow of the member, and passing high frequency alternating current through the circuit to heat the interior of the member by induction.

Preferably the outer surface is maintained at substantially 450° C., and the internal surface is maintained at substantially 1,300° C., to give a radial temperature gradiant of substantially 850° C.

The invention uses a co-axial and therefore low-impedance circuit as aforesaid, and, according to the geometry of its components, the circuit can give a specific output of the order of 930 W/cm$^2$ in a small bore (e.g. diameter 9 mm) in the uranium carbide testpiece. The specific output may subsequently be increased.

The invention also provides apparatus for setting up a radial temperature gradient across a hollow member which is a good conductor of heat (e.g. a uranium carbide testpiece), comprising a cooling jacket arranged for surrounding the member to cool the external surface thereof, and a low-impedance co-axial electrical circuit having one section of high impedance arranged for positioning within the hollow of the member, so that high frequency alternating current may be applied to the circuit to heat the interior of the member by induction.

By way of example a specific embodiment of the invention will now be described and illustrated with reference to the accompanying drawings.

Figure 2:
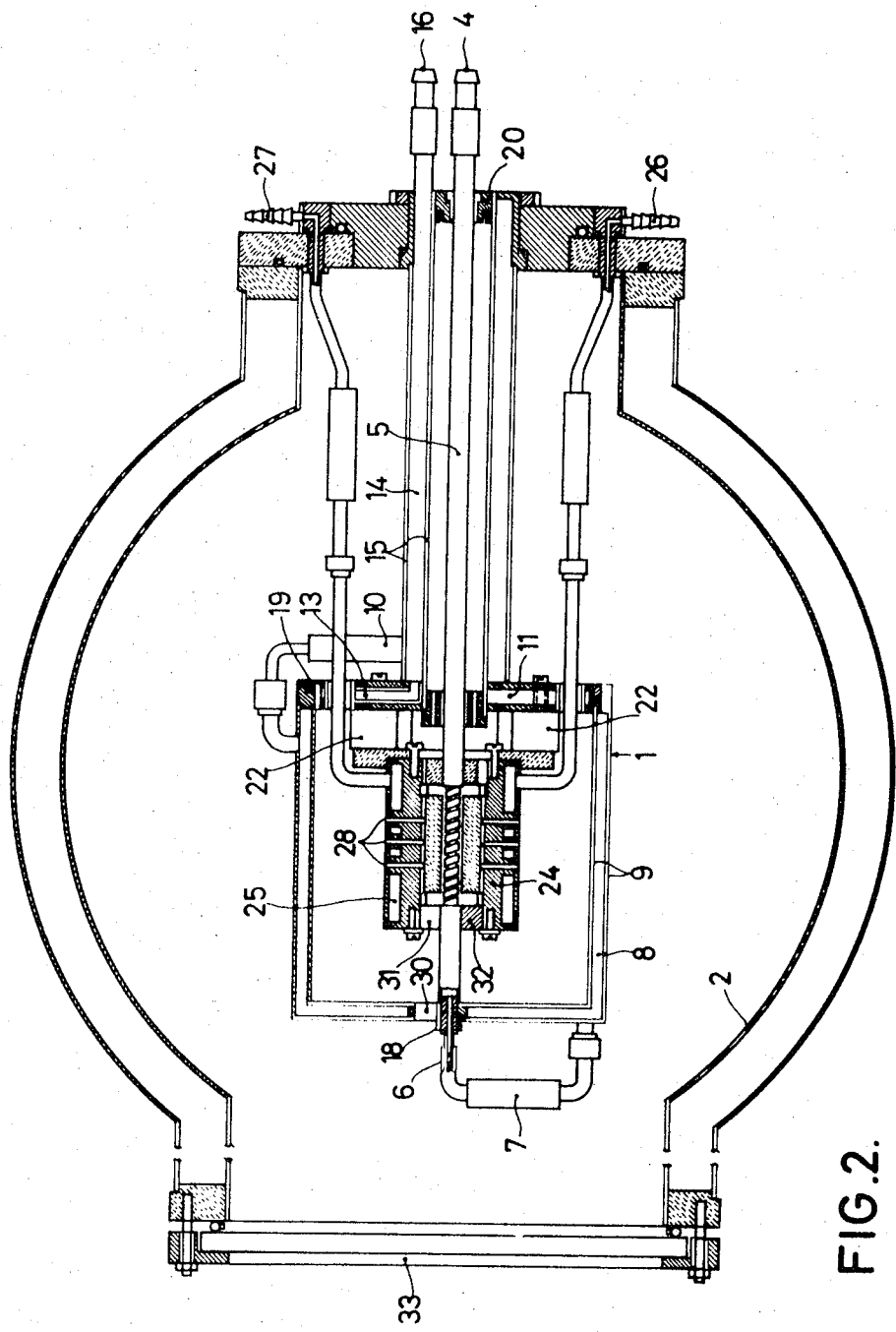

FIG. 1 shows an apparatus according to the invention including a vacuum reservoir, and FIG. 2 shows in detail part of the apparatus in FIG. 1.

The drawings show the means for setting up the temperature gradient enclosed in a vacuum reservoir 2 in an atmosphere of $<1.10^{-5}$ Torr. A water cooling system is used. In spite of the small free cross-section of the coil 3 which is used, it can be connected to a drinking water supply with pressures of the order of 6 kg/cm$^2$, since a flow rate of 1.6 l/min is sufficient to cool the coil. The vacuum inside reservoir 2 is produced by a normal diffusion pump.

Water from the supply travels from the inlet 4 (FIG. 2) in the central tube 5 of the co-axial line into the induction coil 3, comes out at the pipe connection 6 and then passes through a tombac (copper-based alloy) member 7 and flows down into a cavity 8 formed by two copper containers 9. The water leaves cavity 8 at the top (as viewed in the figures) and flows through a second tombac member 10 into a space 11 formed by two copper discs 12, after which it flows through piping 13 into a cavity 14 formed by tube 15 and then flows through connection 16 and is allowed to run away after it has cooled the secondary winding of the high frequency transformer (not shown in the drawing).

The high frequency circuit follows much the same path as the cooling circuit already described.

The high frequency current, the value of which is increased in the high frequency transformer, flows through connection 4 and the line 5 to coil 3, generating induced currents in the cylindrical testpiece 17. The current flows from the winding through the contact made between nut 18 and containers 9, after which it flows through contact 19, discs 12 and tubes 15 and through connection 16 to the secondary winding of the high frequency transformer. Since the voltages used are not high, the central tube can be insulated from the outer, co-axial tubes 15 in a simple manner by using "celeron" washers 20.

An alumina washer 21 having four "celeron" supports 22 supports the jacket 24 cooling the testpiece 17 by means of screws 23. The jacket is used for removing the heat generated inside the testpiece and thus maintaining its surface temperature at the desired value. The jacket, which is made of brass, comprises an annular chamber 25 for cooling water, which is brought in from the outside through connection 26 and is discharged from connection 27. Twelve holes 28 extending through the body of jacket 24 provide space for 12 thermocouples. The cylindrical cavity 29 inside jacket 24 is covered by a thermal barrier made up of sheets of oxidized aluminum, and the thermal barrier is covered with a thin layer of alumina four-tenths mm thick, since the temperature at the surface of testpiece 17 is near the melting point of aluminum. Two aluminum washers 32 are used to center the coil with respect to the jacket 24 and the uranium carbide testpiece 17. A window 30 formed in the container 9 and a window 31 formed in the aluminum washer 32 to the left of the diagram can be used for making external measurements with a photometric-type pyrometer of the radial temperature of testpiece 17; to this end, the reservoir 2 has a glass window 33.

Coil 3 is made of a tube of annealed copper having a rectangular cross-section of 3 × 2 mm and a thickness of one-fourth mm. The tube, which prior to forming is filled with very fine powder, e.g. sodium bicarbonate, is wound on a lathe round a steel rod approximately 4 mm in diameter and is hammered to reduce its external dimensions to a uniform diameter of 7.2 mm.

Pieces of the length required in the apparatus are cut off the resulting coil and are emptied by reacting the sodium bicarbonate with dilute acetic acid. An alumina rod is introduced into the central aperture of the coil in order to increase its mechanical strength; the aperture is then plugged at both ends under vacuum conditions by brazing two brass plugs. Finally, the coil is welded on the central tube 5 of the co-axial unit. In order to prevent the testpiece breaking and to prevent small pieces of testpiece falling on the coil and causing arcs and short-circuits between the turns, a thin insulating layer of alumina, having a thickness of the order of two-tenths mm, is applied to the outer surface of the coil.

To obtain more uniform heating, the coil is wound when its wide side is facing outwardly, and the spacing between turns is limited to four-tenths mm.

In order to produce a consecutive series of contact points and consequently of temperature drops, 11 layers of oxidized aluminum, each 0.045 mm thick, are disposed inside the cooling jacket 24.

Since the carbide was required to have an external temperature of approximately 500° C., it was found necessary to protect the sheets of oxidized aluminum, since the aluminum became liquid at this temperature under the operating pressure conditions, thus short-circuiting the thermocouples and producing other effects. The protection was obtained by applying a layer of alumina approximately 0.4 mm thick.

To apply this layer, 12 holes corresponding to the holes for the thermocouples on the jacket were made in a steel cylinder having dimensions similar to those of the carbide testpiece 17. The required thickness of alumina was then applied to the outer surface. After being coated in this manner, the cylinder was introduced into the cooling jacket so as to be concentric with the sheets of oxidized aluminum, and was then heated to 850°–900° C. by high frequency. Because of the expansion, the alumina was compressed against the inner wall of the cooling jacket, to which it adhered firmly. During the subsequent cooling stage, the alumina came loose from the steel member, which could easily be slid out after it had returned to its normal size. The desired protection was thus obtained, and holes were meanwhile made for the thermocouples.

The main advantage of the method described is that very high specific outputs can be obtained of the order of 1,000 W/cm$^2$ in apertures of small dimensions.

Furthermore, the complete absence of contact between the testpiece and the heating element eliminates, avoids or reduces any problems of incompatibility between the different materials at high temperatures and allows the testpiece to move relatively freely when it expands on heating. A major advantage of the invention is the fact that the inner surfaces of small holes formed in relatively large metal masses can be heated, for annealing or other purposes, in which case the mass itself is used as an integral part of the co-axial circuit for the high frequency current.

The invention which is described here and illustrated in the accompanying drawings is not limited to the embodiment and features shown, and can be modified in numerous ways without departing from its spirit.

I claim:

1. A method of setting up a radial temperature gradient across a hollow member which is a good conductor of heat, comprising surrounding the member with a cooling jacket to cool the external surface thereof, inserting a high impedance portion of a low-impedance co-axial electrical circuit into the hollow of the member, and passing high frequency alternating current through the circuit to heat the interior of the member by induction.

2. The method of claim 1 including heating the internal surface of the hollow member to substantially 1,300° C. and cooling the external surface of said member to approximately 850° C. to cause a thermal gradient of about 450° C. across the member.

3. Apparatus for setting up a radial temperature gradient across a hollow member which is a good conductor of heat, comprising a cooling jacket arranged for surrounding the member to cool the external surface thereof, and a low-impedance co-axial electrical circuit having one section of high impedance arranged for positioning within the hollow of the member, so that high frequency alternating current may be applied to the circuit to heat the interior of the member by induction.

4. Apparatus as claimed in claim 3 in which the member is cylindrical and has a bore therethrough, the cooling jacket having a cylindrical cavity to receive the member.

5. Apparatus as claimed in claim 3 in which the high impedance section of the circuit comprises a hollow copper coil cooled internally by water.

6. Apparatus as claimed in claim 5, in which the outside of the coil is covered with a layer of alumina.

7. Apparatus as claimed in claim 5, in which the coil is of rectangular cross-section.

8. Apparatus as claimed in claim 4 in which the cooling jacket has an internal coating comprising at least one sheet of aluminum, the sheet or sheets being covered with a layer of alumina.

9. Apparatus as claimed in claim 8 in which the layer of alumina is deposited by a thermal expansion method.

* * * * *